US006918021B2

(12) United States Patent
Krick et al.

(10) Patent No.: US 6,918,021 B2
(45) Date of Patent: Jul. 12, 2005

(54) SYSTEM OF AND METHOD FOR FLOW CONTROL WITHIN A TAG PIPELINE

(75) Inventors: Robert F. Krick, Fort Collins, CO (US); David Johnson, Fort Collins, CO (US); Paul L. Rogers, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/118,801

(22) Filed: Apr. 9, 2002

(65) Prior Publication Data

US 2002/0169931 A1 Nov. 14, 2002

Related U.S. Application Data

(63) Continuation-in-part of application No. 09/853,738, filed on May 10, 2001, and a continuation-in-part of application No. 09/853,951, filed on May 10, 2001, now abandoned.

(51) Int. Cl.[7] .............................................. G06F 12/00
(52) U.S. Cl. ...................................... 711/163; 370/229
(58) Field of Search ................................ 711/140, 169; 370/229

(56) References Cited

U.S. PATENT DOCUMENTS

| | | | | |
|---|---|---|---|---|
| 4,392,200 | A | * 7/1983 | Arulpragasam et al. | .... 711/140 |
| 5,649,154 | A | 7/1997 | Kumar et al. | ............... 395/449 |
| 5,649,157 | A | 7/1997 | Williams | .................... 395/478 |
| 5,701,292 | A | * 12/1997 | Chiussi et al. | ............... 370/232 |
| 5,913,049 | A | * 6/1999 | Shiell et al. | ................. 712/215 |
| 6,014,732 | A | 1/2000 | Naffziger | ..................... 711/203 |
| 6,038,651 | A | * 3/2000 | VanHuben et al. | ............ 712/21 |
| 6,049,851 | A | 4/2000 | Bryg et al. | .................. 711/141 |
| 6,393,550 | B1 | * 5/2002 | Fetterman et al. | .......... 712/214 |
| 6,400,684 | B1 | * 6/2002 | Benmohamed et al. | .. 370/230.1 |
| 6,754,772 | B2 | * 6/2004 | Crook et al. | ................. 711/118 |
| 6,810,475 | B1 | * 10/2004 | Tardieux | ...................... 712/219 |
| 2003/0005263 | A1 | * 1/2003 | Eickemeyer et al. | ........ 712/218 |
| 2003/0158992 | A1 | * 8/2003 | Ajanovic et al. | ........... 710/305 |

OTHER PUBLICATIONS

Chiussi et al., "Dynamic max rate control algorithm for available bit rate service in ATM networks", 1996. GLOBECOM '96, vol. 3, 18–22, pp.: 2108–2117.*
Chiussi et al., "Backpressure in shared–memory–based ATM switches under multiplexed bursty sources", Mar. 1996, INFOCOM '96, vol.: 2, 24–28 pp.: 830–843.*
Hamaoka et al., "Optimized Feedback Design for Backpressure–Based Fairness Control" May 2002, High Performance Switching and Routing, pp.: 219–223.*
DeBlasi, Mario. "Computer Architecture," Addison–Wesley Publishing Company. New York (1990) pp. 273–291.
Tabak, Daniel. "Advanced Microprocessors," McGraw–Hill, Inc. New York (1991) pp. 244–248.
Papamarcos, Mark et al. "A Low Overhead Coherence Solution for Multiprocessors With Pivate Cache Memories," IEEE. (1984) pp. 348–354.
Stone High Performance Computer Architecture, Addison–Wesley, 2nd Ed. (1990) pp. 29–39.

* cited by examiner

*Primary Examiner*—Mano Padmanabhan
*Assistant Examiner*—Paul Baker

(57) ABSTRACT

A controller comprising a pipeline including a plurality of connected sequential elements wherein a first sequential element is connected to one or more transaction sources; a flow control logic including at least one resource utilization value register; resource allocation logic responsive to a transaction valid signal and one or more adjustment inputs, and comparison logic having a threshold value and a transaction control signal output connected to the one or more transaction sources; pipeline control logic having an adjustment output connected to the resource allocation logic; and a resource control logic having an output connected to an adjustment input of the resource allocation logic.

23 Claims, 3 Drawing Sheets

SYSTEM OF AND METHOD FOR FLOW CONTROL WITHIN A TAG PIPELINE

RELATED APPLICATIONS

The present application is a Continuation-In-Part of previously filed, commonly assigned U.S. patent application Ser. No. 09/853,738, entitled "FAST PRIORITY DETERMINATION CIRCUIT WITH ROTATING PRIORITY," filed May 10, 2001, and commonly assigned U.S. patent application Ser. No. 09/853,951, entitled "SYSTEM OF AND METHOD FOR MEMORY ARBITRATION USING MULTIPLE QUEUES," filed May 10, 2001, abandoned, the disclosures of which are hereby incorporated herein by reference.

TECHNICAL FIELD

This invention relates generally to computer memory systems and more specifically to memory control within a system to improve access time to data using memory.

BACKGROUND

There is an ever growing need to increase the speed with which computers process information. One element for increasing overall processing speed includes improving memory access time. As one skilled in the art recognizes, memory latency is a major limitation on processing speed, an issue that has been addressed using a multitude of techniques and approaches.

A common manner by which to improve memory access time is to provide a cache memory along with a main memory. A cache memory is typically associated with a processor, and requires less access time than the main memory. Copies of data from processor reads and writes are retained in the cache. Some cache systems retain recent reads and writes, while others may have more complex algorithms to determine which data is retained in the cache memory. When a processor requests data that is currently resident in the cache, only the cache memory is accessed. Since the cache memory requires less access time than the main memory, processing speed is improved. Today, memory accesses from the main memory may take as long as 250 nanoseconds (or more) while cache access may take as little as two or three nanoseconds.

Additionally, a cache system may be used to increase the effective speed of a data write. For example, if a processor is to write to a storage location, the processor may perform a data write to the cache memory. The cache memory and associated control logic may then write the data to the main memory while the processor proceeds with other tasks.

Computer systems may also extend the use of cache and may employ a multilevel hierarchy of cache memory, with a small amount of relatively fast primary or first level cache memory at the highest level of the hierarchy and proceeding to relatively slower, lower cost, higher-capacity memory at the lowest level of the hierarchy. Typically, the hierarchy includes a small but fast memory system called a primary cache, either physically integrated within a processor integrated circuit or mounted physically near the processor. Primary cache incorporated on the same chip as the Central Processing Unit (CPU) may have a clock frequency (and therefore an access time) equal to the cycle frequency of the CPU. There may be separate instruction primary cache and data primary cache. Primary caches typically maximize performance over a relatively small amount of memory so as to minimize data and/or instruction latency. In addition, primary cache typically supports high bandwidth transfers. Secondary cache or tertiary cache may also be used and is typically located further from the processor. These secondary and tertiary caches provide a "backstop" to the primary cache and generally have larger capacity, higher latency, and lower bandwidth than primary cache.

If a processor requests data or instruction from a primary cache and the item is present in the primary cache, a cache "hit" results. Conversely, if an item is not present, there is a primary cache "miss." In the event of a primary cache miss, the requested item is retrieved from the next level of the cache memory or, if the requested item is not contained in cache memory, from the main memory.

Typically, memories are organized into groupings of bits called words (for example, 32 bits or 64 bits per word). The minimum amount of memory that can be transferred between a cache and a next lower level of the memory hierarchy is called a cache line, or sometimes a block. A cache line is typically multiple words (for example, 16 words per line). Memory may also be divided into pages (also called segments), with many lines per page. In some systems, page size may be variable.

Caches have been constructed using three principal architectures: direct-mapped, set-associative, and fully-associative. Details of the three cache types are described in the following prior art references, the contents of which are hereby incorporated by reference in their entirety: De Blasi, "Computer Architecture," ISBN 0-201-41603-4 (Addison-Wesley, 1990), pp. 273–291; Stone, "High Performance Computer Architecture," ISBN 0-201-51377-3 (Addison-Wesley, 2d Ed. 1990), pp. 29–39; Tabak, "Advanced Microprocessors," ISBN 0-07-062807-6 (McGraw-Hill, 1991) pp. 244–248.

With direct mapping, when a line of memory is requested, only one line in the cache has matching index bits. Therefore, the data can be retrieved immediately and driven onto a data bus before the system determines whether the rest of the address matches. The data may or may not be valid, but in the usual case where it is valid, the data bits are available on a data bus before the system confirms validity of the data.

With set-associative caches, it is not known which line corresponds to an address until the index address is computed and the tag address is read and compared. That is, in set-associative caches, the result of a tag comparison is used to select which line of data bits within a set of lines is presented to the processor.

A cache is said to be fully associative when a cache stores an entire line address along with the data and any line can be placed anywhere in the cache. However, for a large cache in which any line can be placed anywhere, substantial hardware is required to rapidly determine if and where an entry is stored in the cache. For large caches, a faster, space saving alternative is to use a subset of an address (called an index) to designate a line position within the cache, and then store the remaining set of more significant bits of each physical address (called a tag) along with the data. In a cache with indexing, an item with a particular address can be placed only within a set of cache lines designated by the index. If the cache is arranged so that the index for a given address maps to exactly one line in the subset, the cache is said to be direct mapped. If the index maps to more than one line in the subset, the cache is said to be set-associative. All or part of an address is hashed to provide a set index which partitions the address space into sets.

In all three types of caches, an input address is applied to comparison logic. Typically, a subset of the address, called tag bits, is extracted from the input address and compared to tag bits of each cache entry. If the tag bits match, then corresponding data is extracted from the cache.

In general, direct-mapped caches provide fastest access but require the most time for comparing tag bits. Fully-associative caches have greater access time but consume higher power and require more complex circuitry.

When multiple processors with their own respective caches are included in a system, cache coherency protocols are used to maintain coherency between and among the caches. This is because the same data may be stored in or requested by more than one cache. There are two classes of cache coherency protocols:

1. Directory based: The information about one block of physical memory is maintained in a single, common location. This information usually includes which cache(s) has a copy of the block and whether that copy is marked exclusive for future modification. An access to a particular block first queries the directory to see if the memory data is stale and the current data resides in some other cache (if at all). If it is, then the cache containing the modified block is forced to return its data to memory. Then the memory forwards the data to the new requester, updating the directory with the new location of that block. This protocol minimizes interbus module (or inter-cache) disturbance, but typically suffers from high latency and is expensive to build due to the large directory size required.

2. Snooping: Every cache that has a copy of the data from a block of physical memory also has a copy of the information about the data block. Each cache is typically located on a shared memory bus, and all cache controllers monitor or "snoop" on the bus to determine whether or not they have a copy of the shared block.

Snooping protocols are well suited for multiprocessor system architecture that use caches and shared memory because they operate in the context of the preexisting physical connection usually provided between the bus and the memory. Snooping is often preferred over directory protocols because the amount of coherency information is proportional to the number of blocks in a cache, rather than the number of blocks in main memory.

The coherency problem arises in a multiprocessor architecture when a processor must have exclusive access to write a block of memory or an object into memory, and/or must have the most recent copy when reading an object. A snooping protocol must locate all caches that share the object to be written. The consequences of a write to shared data are either to invalidate all other copies of the data, or to broadcast the write to all of the shared copies. Because of the use of write-back caches, coherency protocols must also cause checks on all caches during memory reads to determine which processor has the most up to date copy of the information.

Data concerning information that is shared among the processors is added to status bits that are provided in a cache block to implement snooping protocols. This information is used when monitoring bus activities. On a read miss, all caches check to see if they have a copy of the requested block of information and take the appropriate action, such as supplying the information to the cache that missed. Similarly, on a write, all caches check to see if they have a copy of the data, and then act, for example by invalidating their copy of the data, or by changing their copy of the data to reflect the most recent value.

Snooping protocols are of two types:

Write invalidate: The writing processor causes all copies in other caches to be invalidated before changing its local copy. The processor is then free to update the data until such time as another processor asks for the data. The writing processor issues an invalidation signal over the bus, and all caches check to see if they have a copy of the data. If so, they must invalidate the block containing the data. This scheme allows multiple readers but only a single writer.

Write broadcast: Rather than invalidate every block that is shared, the writing processor broadcasts the new data over the bus. All copies are then updated with the new value. This scheme continuously broadcasts writes to shared data, while the write invalidate scheme discussed above deletes all other copies so that there is only one local copy for subsequent writes. Write broadcast protocols usually allow data to be tagged as shared (broadcast), or the data may be tagged as private (local). For further information on coherency, see J. Hennessy, D. Patterson, Computer Architecture: A Quantitative Approach, Morgan Kaufmann Publishers, Inc. (1990), the disclosure of which is incorporated herein by reference in its entirety.

In a snooping coherence multiprocessor system architecture, each coherent transaction on the system bus is forwarded to each processor's cache subsystem to perform a coherency check. This check usually disturbs and/or disrupts the processor's pipeline because the cache cannot be accessed by the processor while the coherency check is taking place.

In a traditional, single ported cache without duplicate cache tags, the processor pipeline is stalled on cache access instructions when the cache controller is busy processing cache coherency checks for other processors. For each snoop, the cache controller must first check the cache tags for the snoop address, and then modify the cache state if there is a hit. Allocating cache bandwidth for an atomic (unseparable) tag read and write (for possible modification) locks the cache from the processor longer than needed if the snoop does not require a tag write. For example, 80% to 90% of the cache queries are misses, i.e. a tag write is not required. In a multi-level cache hierarchy, many of these misses may be filtered if the inclusion property is obeyed. An inclusion property allows information to be stored in the highest level of cache concerning the contents of the lower cache levels.

The speed at which computers process information for many applications, can also be increased by increasing the size of the caches, especially the primary cache. As the size of the primary cache increases, main memory accesses are reduced and the overall processing speed increases. Similarly, as the size of the secondary cache increases, the main memory accesses are reduced and the overall processing speed is increased, though not as effectively as increasing the size of the primary cache.

Typically, in computer systems, primary caches, secondary caches and tertiary caches are implemented using Static Random Access Memory (SRAM). The use of SRAM allows reduced access time which increases the speed at which information can be processed. Dynamic Random Access Memory (DRAM) is typically used for the main memory as it is less expensive, requires less power, and provides greater storage densities.

Typically, prior art computer systems also limited the number of outstanding transactions to the cache at a given time. If more than one transaction were received by a cache, the cache would process the requests serially. For instance, if two transactions were received by a cache, the first transaction request received would be processed first with the second transaction held until the first transaction was completed. Once the first transaction was completed the cache would process the second transaction request.

Numerous protocols exist that maintain cache coherency across multiple caches and main memory. One such protocol is called MESI which is described in detail in M. Papamarcos and J. Patel, "A Low Overhead Coherent Solution for Multiprocessors with Private Cache Memories," in Proceedings of the 11$^{th}$ International Symposium on Computer Architecture, IEEE, New York (1984), pp. 348–354, incorporated herein by reference in its entirety. MESI stands for Modified, Exclusive, Shared, Invalid, the four status conditions for data. Under the MESI protocol, a cache line is categorized according to its use. A modified cache line indicates that the particular line has been written to by the cache that is the current "owner" of the line. (As used herein, the term "owner" and "alike" refers to a designation representing authority to exercise control over the data). An exclusive cache line indicates that a cache has exclusive ownership of the cache line, which will allow the cache controller to modify the cache line. A shared cache line indicates that one or more caches have ownership of the line. A shared cache line is considered read only and any device under the cache may read the line but is not permitted to write to the cache. An invalid cache line or a cache line with no owner identifies a cache line whose data may not be valid since the cache no longer owns the cache line.

SUMMARY OF THE INVENTION

An embodiment of the present invention relates to a controller comprising a pipeline including a plurality of stages interconnected by a plurality of sequential elements. The pipeline may receive a plurality of transactions from one or more sources at a first stage. Flow control logic may include at least one register for storing a resource utilization value and may allocate the resource utilization value stored in the register in response to a transaction valid signal. The flow control logic may be configured to detect a threshold value of the resource utilization value, and in response, provide a transaction control signal to a source of the transactions. A pipeline control logic may be responsive to the transactions for identifying a destination resource having multiple instances associated with each of the transactions and, in response, may initiate modifications of the resource utilization value stored in the register to reflect an allocation of one of the instances of the destination resource associated with the transactions. An embodiment of the present invention may also include a resource control logic configured to identify availability of resources and, in response, provide an availability signal to the flow control logic to adjust a value in the register.

Another embodiment of the present invention may include a computer comprising a processor a bus unit and a cache unit with a controller. The controller may include a pipeline with a plurality of stages interconnected by a plurality of sequential elements, and may receive a plurality of transactions from the processor and from the bus unit at a first stage. Flow control logic may include at least one register for storing a queue utilization value, and may be configured to receive a transaction valid signal and, in response, allocate entries of the queue by adjusting the queue utilization value stored in the register. The flow control logic may provide a transaction control signal to the bus unit and the processor, in response, detects a threshold queue utilization value. An embodiment of the present invention also includes a pipeline control logic responsive to the transactions for identifying a queue having multiple instances associated with each of the transactions and, in response, initiates modifications of the queue utilization value stored in the register to reflect an allocation of one of the entries of the queue associated with the transactions. Resource control logic may be provided to identify availability of resources and in response provide an availability signal to the flow control logic to adjust a value in the register.

DETAILED DESCRIPTION

Figures 1, 2:
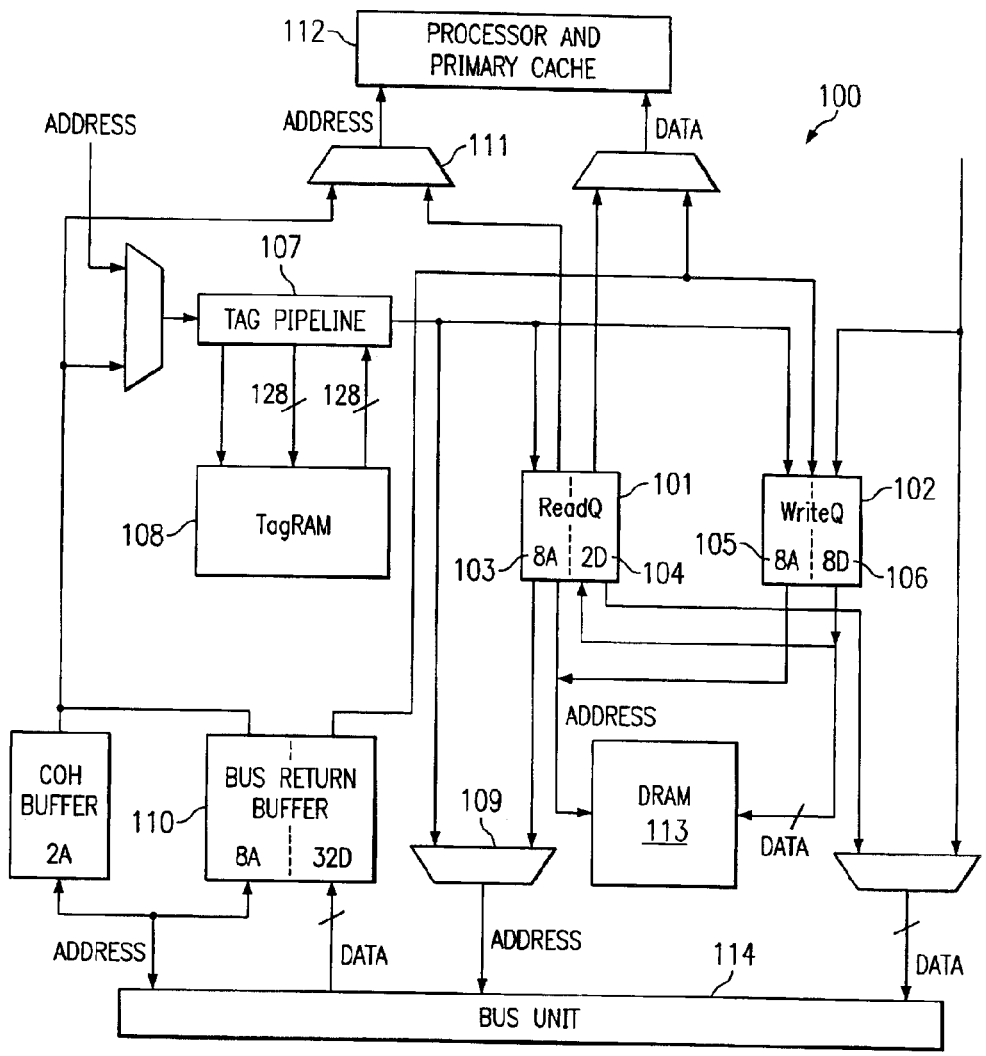
FIG. 1 is a block diagram depicting a secondary cache structure which includes read and write queues.
FIG. 2 is a diagram showing a two dimensional array that represents the set associate cache contained in DRAM.

Generally, a memory hierarchy includes numerous components and subsystems that operate at various speeds. These speeds may differ from the speed of the associated Central Processing Unit (CPU). Typically, as the "distance" from the CPU increases, the speed of the component decreases. These speed mismatches may be addressed by queuing or storing the delayed operations. For example, Static Random Access Memory (SRAM) is used in cache operations due to its inherent operating speed. In contrast, Dynamic Random Access Memory (DRAM) technology has generally not been used for caches because it offers little benefit, in terms of access time, relative to the main memory. However, DRAM technology is approximately four times less expensive per bit of storage than SRAM and, because of its higher density, allows a much larger cache to be implemented for a given area. When "on package" real estate is critical, the density advantage of DRAM verses SRAM also becomes critical.

As the size of the SRAM implemented primary cache increases, the size of the memory required for the secondary or tertiary cache also increases. Typically when a multi-tiered cache hierarchy is implemented, the size of the memory at each succeeding level is increased by a factor of four or eight. Therefore, for a primary cache of one megabyte, a secondary cache of four to eight megabytes is desirable. As the size of the secondary cache increases, the use of SRAM becomes prohibitive because of its limited density. By using DRAM technology secondary caches of thirty two megabytes, or more, are practical. While time to access information stored in DRAM secondary cache increases, the overall affect is offset by the low primary cache miss rate associated with the larger primary cache. In other words, as the size of the primary cache increases, the secondary cache can exhibit a longer latency without degrading system performance.

To further reduce the latency associated with the secondary cache, DRAM memory can be designed to include a faster access time. This faster access time is accomplished by using smaller DRAM chips than in main memory, increasing the number of pins used to transfer data to and from the DRAM, and increasing the frequency with which the DRAM chip operates. Using these techniques (i.e., increase transfer bandwidth) DRAM chips can be designed to access a cache line in the order of 15 nanoseconds and complete the transfer within a second 15 nanoseconds.

Both the increased size of the secondary cache and its longer latency period (as compared to the primary cache) require a methodology to deal with multiple unfulfilled requests for data from the secondary cache. For example, assuming that requests may be received as fast as every two nanoseconds, and if it takes an average of 15 nanoseconds for a request to be serviced, multiple additional requests may be received while the previous request is being serviced. While prior art systems have handled numerous requests to SRAM secondary cache sequentially, the use of larger DRAM secondary cache structures requires a more robust approach. Note that while the present description discusses a single processor requesting a cache line, the structure would be equally applicable to a number of processors which share the secondary cache.

FIG. 1 shows secondary cache structure 100 that includes two queues, Read queue (ReadQ) 101 and Write queue (WriteQ) 102. For purpose of the present illustration, ReadQ 101 can hold eight addresses 103 and two lines of data 104 while WriteQ 102 can hold eight addresses 105 and eight lines of data 106. Address 103 and address 105 are buffered copies of the address of the cache line stored in DRAM 113, not the cache line itself. When a read request is received by the secondary cache, it is processed by tag pipeline 107, which determines the location of the cache line in DRAM 113. The read request is stored in one of the address locations, and while the read is taking place, additional read requests can be received by ReadQ 101. Simultaneously, write requests can be received, processed by tag pipeline 107 and stored in the WriteQ 102. The storage of multiple requests allows the caches to operate as non-blocking caches thereby allowing the system to continue to operate with one or more unfulfilled transactions pending. A memory arbitrator, as described below, is used to determine the sequencing of multiple pending requests.

Tag Pipeline 107 and TagRAM 108 are used to determine whether the requested cache line is resident in the secondary cache. Tag Pipeline 107 is also operative to make room for a new cache line to be written into the secondary cache. If the cache line is resident in the secondary cache, the request is sent by tag pipeline 107 to ReadQ 101 which then acts on the request. ReadQ 101 then supplies the cache line to the CPU. If the cache line is not resident, the request is sent by tag pipeline 107 to bus unit 114 via multiplexer 109. Cache lines returning from bus unit 114 pass through bus return buffer 110 and are sent via multiplexer 111 to processor 112. These cache lines returning from bus unit 114 can also be stored in the secondary cache to reduce access time for subsequent retrievals of the same cache line. Tag Pipeline 107 and TagRAM 108 treat operations from the CPU atomically and sequentially. This hides the queuing behavior that is necessary to provide the data.

WriteQ 102 is responsible for writing new cache lines into the DRAM of the secondary cache. These cache lines are obtained from the processor or the main memory. The processor may send the cache line back to the secondary cache when it has updated the information contained in the cache line or the cache line may be sent to the secondary cache to remove the data from the primary cache. Cache lines coming from the primary cache are typically in the modified or "dirty" state. Storing the modified cache line in the secondary cache rather than the main memory allows a quicker subsequent retrieval of the cache line. Cache lines coming from the main memory pass through bus return buffer 110, to WriteQ 102 and are stored in DRAM 113.

TagRAM 108 (FIG. 1) also contains 65,536 rows (indices) and 4 columns (ways) and is used to determine the location of a cache line in DRAM 113. When a request is received from the primary cache, tag pipeline 107 calculates an index that is used to access TagRAM 108. In a preferred embodiment, forty-four bits (0 through 43) are used to address main memory, with 0 being the most significant bit and 43 being the least significant bit. Since each cache line contains 128 bytes, the lower seven bits (37 through 43) are not used and can be dropped. Sixteen of the remaining bits (21 through 36) are used by tag pipeline 107 to calculate the index for both TagRAM 108 as well as DRAM 113. The remaining bits, bits 0 through 20, referred to as the "tag," are stored in the appropriate portion of TagRAM 108. The bits stored in TagRAM 108, as well as the location as to where the bits are stored, are used by tag pipeline 107 to determine if the desired cache line is present in the secondary cache. In the configuration of FIG. 2, each of the four ways are checked to determine if the cache line is present in the secondary cache.

The size of DRAM 113 in a preferred embodiment is thirty-two megabytes. DRAM 113 can therefore store 262,144 cache lines where the size of each cache line is 128 bytes. In a preferred embodiment, DRAM 113 uses a four way set associate cache that contains 65,536 rows.

FIG. 2 shows a two dimensional array that represents the set associate cache contained in DRAM 113. The two dimensional array contains 65,536 indexes or rows and 4 ways (0, 1, 2, 3). When a cache line is sent to the secondary cache, tag pipeline 107 applies a function to the address to determine where in DRAM 113 the cache line should be stored. The function first determines the index in which the cache line should be stored. Sixteen bits of the cache line address are used to determine the index. Next the cache line way is determined using the next two bits of the function. For example, a cache line with the output of the function on the address 000000000000000110 would be stored in index 1 (0000000000000001) and way 2 (10). The cache line would be stored in space 201 of FIG. 2. Forty four bits are used in the main memory to address individual bytes where the upper 37 bits are used to differentiate the cache lines. The remaining seven address bits are used to specify a byte within the 128 byte cache line. Since only eighteen bits of the cache line address is used to determine where in DRAM 113 the cache line will be stored, more than one cache line may be stored in the same portion of DRAM 113.

Figure 3:
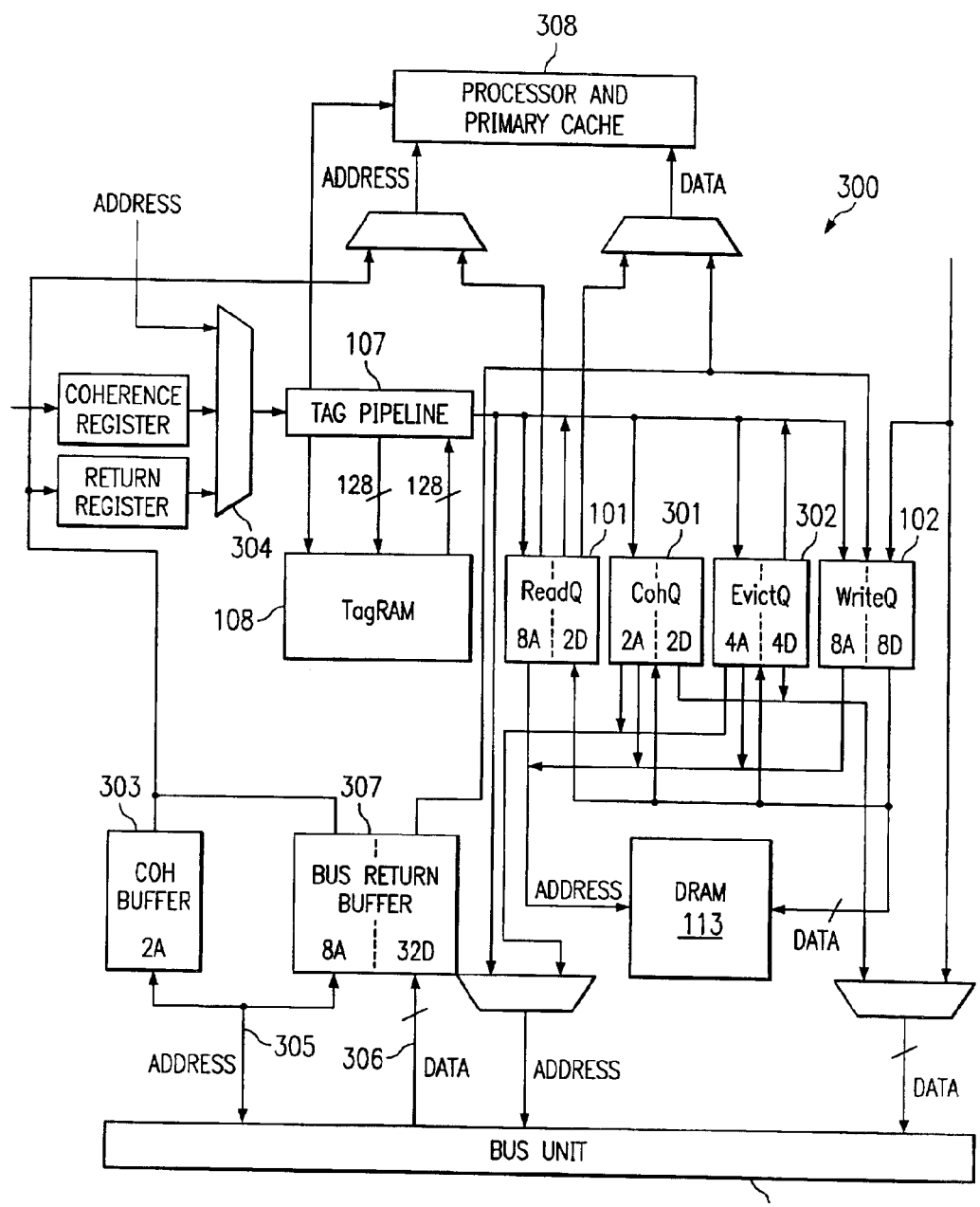
FIG. 3 is a block diagram of a secondary cache structure that includes a read queue, a write queue, a coherency queue and an evict queue, which are each used to read or write cache lines from the DRAM.

FIG. 3 is a secondary cache structure that includes ReadQ 101, WriteQ 102, Coherency Queue (CohQ) 301 and Evict Queue (EvictQ) 302. ReadQ 101, CohQ 301 and EvictQ 302 are each used to read cache lines from the DRAM. In FIG. 3, ReadQ 101 is used to read the cache line from the DRAM and return the cache line back to the processor. A copy of the cache line may be retained in the secondary cache.

CohQ 301 is used to read the DRAM and to send the data to another processor via the external memory bus. CohQ 301 is used to satisfy a snoop from another processor. The snoop takes the cache line from the secondary cache and releases the cache line to a second processor in response to the snoop. CohQ 301 is similar to a remote ReadQ from a second processor.

EvictQ 302 clears a cache line in a private dirty state from the DRAM. EvictQ 302 may discard the data (for shared or private clean data) or EvictQ 302 will return a dirty private cache line to the main memory or to a requesting processor. In either case, EvictQ 302 makes room in the secondary cache for subsequent data. Typically EvictQ 302 cooperates with tag pipeline 107 and TagRAM 108 to flush the oldest cache line from the secondary cache.

The secondary cache of FIG. 3 includes three separate specialized read queues in the form of ReadQ 101, CohQ 301, and EvictQ 302 to enhance overall performance of the system, which is directly tied to the time required to service the reads from a processor. Both ReadQ 101 and CohQ 201 can, if the reads are not performed quickly, cause a processor to stall and thereby reduce its overall operating speed. EvictQ 302 is used to push old cache lines no longer needed back to main memory to allow for storage of new cache lines. By devoting a separate queue to each of the reads, overall system performance is improved.

CohQ 301 of FIG. 3 can hold two addresses and two lines of data while EvictQ 302 can hold four addresses and can hold four lines of data. The number of addresses and the number of lines of data are a function of the performance desired from the secondary cache structure. As the number of addresses and the number of lines of data stored are increased, the overall performance of the system is increased.

The queue architecture shown in FIG. 3 allows the incoming rate of transactions to temporarily exceed the rate at which the incoming transactions can be processed. In other words, there can be multiple requests outstanding at any given time. These outstanding requests are stored in the address queues of ReadQ 101, CohQ 301, EvictQ 302 and WriteQ 102. The separate distinct queues are used for the various transactions to give higher priority to more critical transactions. When multiple outstanding requests are present within a given queue, they are serviced in the order they were received. However, the outstanding requests within a given queue may not be serviced sequentially, as dependencies between queues may require an outstanding transaction in another queue to take priority over the servicing of the next outstanding request in the present queue. The dependencies are determined by the dependency logic.

Still referring to FIG. 3, tag pipeline 107 does not contain any stalls or flushes, and reads and writes the TagRAM 108 for every access. This means the TagRAM 108 may indicate the cache line is stored when the actual write transaction still resides in WriteQ 102. When this occurs, a dependency, as explained below, is created to ensure a read transaction does not attempt to read the cache line before the cache line is written by WriteQ 102. The TagRAM 108 is protected with a SEC/DED Error Correction Code that may be updated on line. Tag pipeline 107 also includes a one cycle buffer at the head of the pipeline to ensure that requests are properly aligned. Tag pipeline 107 uses separate buffers for coherency requests and returns from the bus unit to ensure these transactions are injected into the pipeline at the appropriate time.

Figure 4:
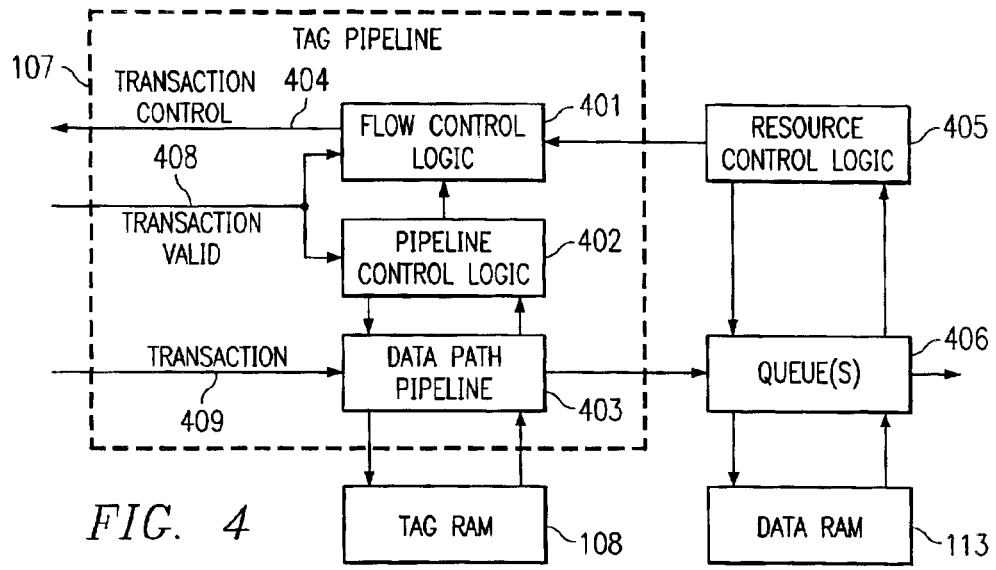
FIG. 4 is a block diagram of the tag pipeline of FIG. 3.

FIG. 4 shows a block diagram of the tag pipeline 107 of FIG. 3. The tag pipeline includes flow control logic 401, pipeline control logic 402 and datapath pipeline 403. Transaction valid signal 408 is supplied to flow control logic 401 and pipeline control logic 402 from an external source. Transaction 409 is supplied to datapath pipeline 403. The function of flow control logic 401 is to determine whether room exists in ReadQ 101, CohQ 301, EvictQ 302, WriteQ 102 of FIG. 3 (collectively represented in FIG. 4 as queues 406) for additional queue entries. If space exists in queues 406 for additional data, transactional control output 510 (FIG. 5) supplies transactional control flow 404 of FIG. 4 with a signal which allows additional entries.

As previously stated, tag pipeline 107 does not contain any stalls or flushes. A pipeline stall occurs when the various stages and values of a pipeline are held constant and the pipeline process is continued using the stored values at a later time. Stored values in stages of a pipeline can be flushed or removed from memory, and the pipeline can be reset to receive new inputs. Stalls and flushes detract from system performance because their occurrence must be detected and communicated to other system components. Other system components must also reissue transactions affected by flushes. Note that a pipeline may be composed of a series of latches that are used to distribute a process or work over a number of clock cycles. Tag pipeline 107 and TagRAM 108 of FIG. 3 display the characteristics of a fast cache to the rest of the system in FIG. 3. Transactions received by tag pipeline 107 are processed in the order in which they are received from the core from the CPU. All transactions received from the core by the tag pipeline are sent to one of the queues 101, 301, 302, 102, or are sent to the bus unit of FIG. 3.

Returning to FIG. 4, the circuitry depicted is used to control which transactions are received by tag pipeline 107. This control is referred to as flow control. Tag pipeline 107 may receive transaction requests from the CPU, from cache lines returning from the bus, or from snoops received from other memory users. Flow control according to one embodiment of the present invention enables tag pipeline 107 to operate without stalls or flushes.

Returning to FIG. 3 addresses associated with returns from the bus unit and snoops are received at 305 and pass the coherency buffer 303 and the bus return buffer 307 of FIG. 3. These transactions are received by multiplexer 304. Returns from bus unit 309 (such as data 306) must always be supplied to CPU 308, and may also be received by the tag pipeline 107, if available. Returns from the bus unit are typically stored in DRAM 113. As previously described, this information passes through tag pipeline 107 and is directed to WriteQ 102 and eventually is stored in DRAM 113. However, WriteQ 102 is associated with a queue that allows eight entries. If the eight entries of WriteQ 102 are full, flow control prevents tag pipeline 107 from storing the return from the bus unit in DRAM 113. In a preferred embodiment, neither private clean lines nor private dirty lines are stored in DRAM 113.

As previously described, a snoop is an inquiry by another process concerning the storage in cache as a memory address. Each snoop received must be processed through tag pipeline 107. In order to ensure that each snoop is processed through tag pipeline 107, a register (not shown) is supplied at the front input end of tag pipeline 107 to store the snoop. Once a snoop is stored in the register, flow control logic 401 of FIG. 4 may wait for an opening in tag pipeline 107 or may create an opening to process the snoop.

Still referring to FIG. 4, when signal 408 is received by flow control logic 401 and pipeline control logic 402 indicating a valid transaction, resources are allocated to the transaction immediately. Once transaction 409 is received by datapath pipeline 403, information relating to the transaction is retrieved by pipeline control logic 402. Upon receipt of transaction information by pipeline control logic 402, pipeline control logic 402 determines the type of transaction received and the resources required to process the transaction. As the transaction is processed in the pipeline, pipeline control logic 402 signals flow control logic 401, which is used to de-allocate resources that have been reserved to process transactions that are, based on the actual transaction received, no longer required. Note that rather than allocating potential resources required to process transaction 409, and then de-allocating the resources that are not required, resources required for a specific transaction may be specifically identified and allocated. These resources can then be reserved and used in the processing of the received transaction.

Still referring to FIG. 4, for purposes of this example, a transaction valid signal 408 and an L1 miss transaction are sent to tag pipeline 107. Transaction valid signal 408 is used as an indication of when datapath pipeline 403 should sample incoming signals such as transaction 409. If transaction valid signal 408 is invalid, the input 409 to datapath pipeline 403 is ignored. Otherwise, upon receipt of transaction valid signal 408, a counter function of flow control logic 401 is incremented and an entry in each of the queues is allocated to process the incoming transaction 409. Each transaction 409 entering the secondary cache of (L2) causes an entry to be written into one or more of the following locations: L2 ReadQ 101, L2 EvictQ 302, L2 WriteQ 102, L2 CohQ 301, and bus request queue. By pre-allocating a queue entry for incoming transactions, the complexity of pipeline stalls or flushes is eliminated. This logic guarantees that space is available for the transaction when the transaction exits datapath pipeline 403. Previously reserved resources are de-allocated when a determination is made that the resources are no longer required.

Figure 5:
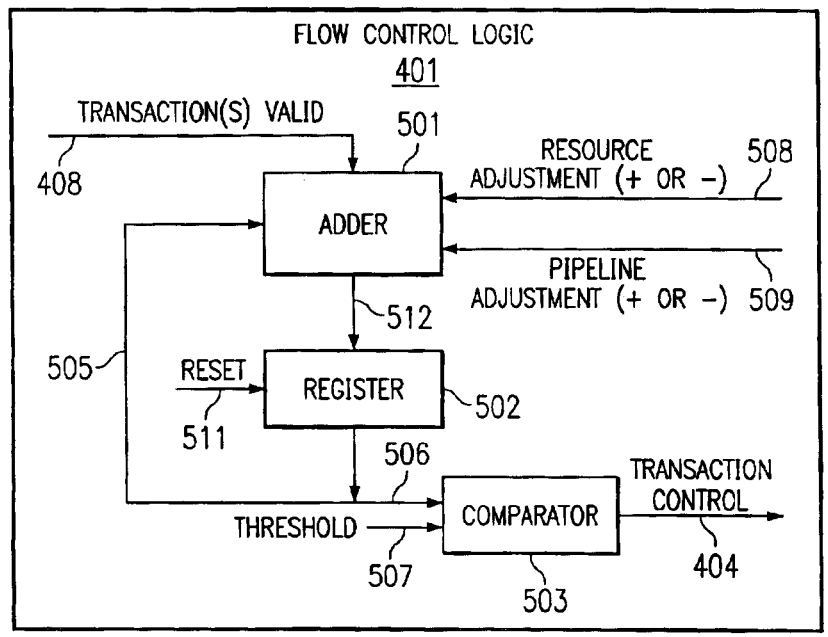
FIG. 5 is a block diagram of the components of the Flow Control Logic of FIG. 4.

The current counter value is next compared to a threshold value, as described in FIG. 5 to determine whether a threshold for one or more of the queues is exceeded. If a threshold for one or more queues is exceeded, flow control ensures that the additional requests are inhibited, i.e., are not received from the core or from the bus unit.

If however, the current counter value does not exceed any of the threshold values for the queues, except as noted below, transactions received by datapath pipeline 403 of FIG. 4 are processed. For example, if the transaction represents a level one miss, the datapath pipeline 403 processes the transaction, looks for the proper memory location in TagRAM 108 to determine whether the cache line exists, and if the cache line exists, the transaction is written into ReadQ 101 of FIG. 3 and other reserved queue resources can be de-allocated. At some later time, DRAM 113 is actually read and the data is returned via the data portion of ReadQ 101. The data read from DRAM 113 is sent back to the requesting entity, or in this case, the CPU core itself. After data has been sent to the core, resource control logic 405 determines that the entry in its queue has been processed and sends an indication to flow control logic 401 that that queue entry has been de-allocated. Resource control logic 405 may represent queue control logic or destination resource queue. Flow control logic 401 then uses this information to determine if additional transactions can be processed.

As a second example, transaction 409 may comprise an L1 miss where the value is not stored in DRAM 113. In this case, assuming a transaction valid signal 408 is received and flow control logic 401 determines resources are available to process the transaction, the L1 miss is received by datapath pipeline 403. Datapath pipeline 403 accesses TagRAM 108 to determine whether the cache line is present in the secondary cache. However, in this case, the cache line is not resident in the secondary cache and there is an L2 miss. This transaction must then be sent to the bus unit for further processing. In this case, the reserved queues for processing this transaction are unnecessary, other than the bus request queue and may be de-allocated. Now pipeline control logic 402 notifies flow control logic 401 that the transaction does not require resources and the reserved resources may be de-allocated. The allocations of entries in each of the possible queues reduces the amount of time necessary to process the incoming transaction 409.

FIG. 5 is block diagram of the components of the flow control logic of FIG. 4. The logic includes adder 501 connected to provide the sum output 512 of the adder 501 to be stored in register 502. An output from register 502 is fed back 505 to adder 501 and is also provided as one of a pair of inputs 506 to comparator 503. The other input to comparator 503 represents threshold 507. Threshold 507 may be hardwired or programmable.

Operationally, when the system is reset, from reset signal 511 or during initialization, register 502 is initialized to zero. The output of register 502 is received by comparator 503 and adder 501. At initialization, transaction valid adjustment 504, destination adjustment 508, and pipeline adjustment 509, are all initialized to and are expected to be zero, so a zero value is received by register 502 from adder 501. Comparator 503 compares the value received from register 502 with threshold 507. If the value received from register 502 exceeds threshold 507, transaction control 510 is configured to cause flow control logic 401 (FIG. 4) to prevent additional transactions from being received.

Threshold 507 must be set to compensate for the delay associated with providing a signal from transaction control 510. The threshold must be set so the transactions received by datapath pipeline 403 of FIG. 4 are inhibited when queues 406 are full or may be filled by transactions which cannot be stopped. For instance, if ReadQ 101 of FIG. 3 contains eight entries, and requires two cycles for transaction control 510 to signal flow control logic 401 to stop incoming transactions, when ReadQ 101 contains six entries the threshold value must be set so that transaction control 510 appropriately signals flow control logic 401. The flow control logic of FIG. 5 is replicated for each of the four queues of FIG. 3. Accordingly, each queue may have a different value for threshold 507.

Returning to FIG. 5, when transaction valid adjustment 504 is received, one or more values are added to the current value and register 502 by way of adder 501. A preferred implementation allows for the receipt of multiple transactions simultaneously. Additionally, a single transaction can result in more than one resource being allocated. For example, a write back from Level 1 cache can evict two lines out of Level 2 cache so transaction valid adjustment 504 for this example would be equal to a +2. Pipeline adjustment 509 may also supply a value to adder 501 to effect the current value and register 502. For example, if a particular transaction did not effect the Level 2 memory, pipeline adjust 509 may reflect the de-allocation of the reserved resources. Destination adjustment 508 is received by adder 501 from external sources and may be used to allocate resources used by other processes. One example of the use of destination adjustment 508 is prompted when a cache line is placed on the WriteQ as soon as data is received from the bus unit in a return from the bus unit of the cache line. In this case the data is not passed through a tag pipeline immediately.

Figure 6:
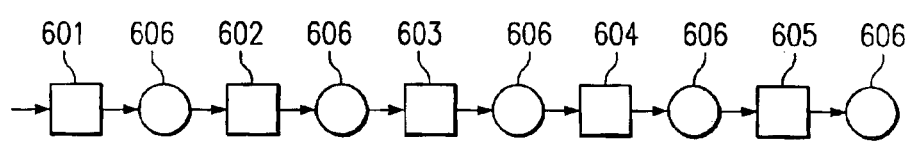
FIG. 6 is a block diagram of a plurality of series connected sequential elements representing one embodiment of the present invention.

FIG. 6 is a block diagram of a pipeline including a plurality of series connected sequential elements representing one embodiment of the present invention. Sequential elements 601–605 may be latches or flip flops. Element 606 represents clocks used to step a received signal through the sequential elements.

What is claimed is:

1. A controller comprising:
    a pipeline having a plurality of series connected sequential elements, wherein a first sequential element is connected to one or more transaction sources;
    flow control logic including at least one resource utilization value register, and resource allocation logic connected to said resource utilization value register and responsive to a transaction valid signal and one or more adjustment inputs, and comparison logic having an input connected to said resource utilization value register and a threshold value and a transaction control signal output connected to said one or more transaction sources;
    pipeline control logic connected to said pipeline data path and said transaction valid signal having an adjustment output connected to said resource allocation logic; and
    a resource control logic connected to one or more resources having an output connected to an adjustment input of said resource allocation logic.

2. The controller according to claim 1 wherein a first one of said sequential elements of said pipeline receives inputs from said one or more transaction sources as a continuous sequence.

3. The controller according to claim 1 wherein inputs from said transaction sources include memory operations.

4. The controller according to claim 3 wherein said memory operations include at least one operation from the group consisting of:
    a memory read request;
    a snoop request;
    a memory write-back request; and
    a cache line being returned from said memory.

5. The controller according to claim 3 wherein said memory operations include each of:
    a memory read request;
    a snoop request;
    a memory write-back request; and
    a cache line being returned from said memory.

6. The controller according to claim 1 wherein said resource utilization value register comprise a counter.

7. The controller according to claim 1 wherein said flow control logic is configured to increment a resource utilization value stored in said resource utilization value register and said pipeline control logic is configured to identify one or more destination resources not required in connection with each of said one or more transaction sources and, in response, initiate a decrement of respective ones of said resource utilization values associated with said destination resources not required.

8. The controller according to claim 7 wherein said flow control logic selectively modifies said resource utilization values by one of adding and subtracting a predetermined value to or from said resource utilization values.

9. The controller according to claim 1 wherein said flow control logic is configured to decrement a resource utilization value stored in said resource utilization value register and said pipeline control logic is configured to identify one or more destination resources not required in connection with each of said one or more transaction sources and, in response, initiate a increment of respective ones of said resource utilization values associated with said destination resources not required.

10. The controller according to claim 9 wherein said flow control logic selectively modifies said resource utilization values by one of adding and subtracting a predetermined value to or from said resource utilization values.

11. The controller according to claim 1 wherein said pipeline control logic is configured to identify one or more destination resources required in connection with each of said one or more transaction sources, said flow control logic responsive to said identification of said one or more of said destinations resources required to selectively increment a resource utilization value of said resource utilization value register associated with said required destination resources.

12. The controller according to claim 1 wherein said pipeline control logic is configured to identify one or more of said destination resources required in connection with each of said one or more transaction sources, said flow control logic responsive to said identification of said one or more destinations resources required to selectively decrement a resource utilization value of said resource utilization value register associated with said required destination resources.

13. The controller according to claim 1 wherein said pipeline control logic is configured to transmit a resource requirement signal to said flow control logic including an indication of one or more destination resources required by respective ones of said transactions.

14. The controller according to claim 1 wherein said transaction control signals comprise one of a transaction blocking signal and a transaction enable signal.

15. The controller according to claim 1 wherein said transaction control signals are provided by a plurality of sources.

16. The controller according to claim 1 wherein said transaction control signals are provided by first and second sources in a nonoverlapping manner.

17. The controller according to claim 1 wherein said transaction control signals are provided by first and second sources and require different destinations resources.

18. The controller according to claim 1 wherein said flow control logic includes a plurality of output signals for providing respective transaction control signals to respective sources of said transaction control signals.

19. The controller according to claim 1 wherein said flow control logic includes a plurality of registers for storing respective resource utilization values, said flow control logic configured to receive said transaction valid signal and in response allocate respective ones of registers, said flow control logic further configured to detect a threshold value of said resource utilization values, and in response provide a transaction control signal to a source of said transactions.

20. The controller according to claim 1 wherein said flow control logic includes an instruction control logic, a data control logic and an overall control logic.

21. The controller according to claim 1 wherein said pipeline control logic is responsive to said transactions for identifying a queue resource having multiple instances associated with each of said transactions and, in response, initiating modification of a resource utilization value stored in said resource utilization value register to reflect an allocation of one of said instances of a queue resource associated with said transactions.

22. The controller according to claim 1 wherein said resource control logic is configured to identify availability of a queue resource and in response, provide a resource adjustment signal to said flow control logic to adjust a value in said register.

23. A computer comprising:

a processor;

a bus unit;

a cache unit including a controller, the controller including:

a pipeline including a plurality of series connected sequential elements, said pipeline receiving a plurality of transactions from said processor and from said bus unit at a first one of said sequential elements;

a flow control logic including at least one register for storing a resource utilization value, said flow control logic configured to receive a transaction valid signal and in response allocate entries of said resource by adjusting said resource utilization value stored in said register, said flow control logic further configured to detect a threshold value of said resource utilization value, and in response provide a transaction control signal to said bus unit and to said processor;

a pipeline control logic responsive to said transactions for identifying a resource having multiple instances associated with each of said transactions and, in response, initiating modification of said resource utilization value stored in said register to reflect an allocation of one of said entries of said resource associated with said transactions; and a resource control logic configured to identify availability of said resources and in response provide a resource adjustment signal to said flow control logic to adjust a value in said register.

\* \* \* \* \*